(12) United States Patent
Tomomizu et al.

(10) Patent No.: US 8,447,214 B2
(45) Date of Patent: May 21, 2013

(54) CHARGING MEMBER AND PROCESS FOR ITS PRODUCTION

(75) Inventors: Yuya Tomomizu, Suntou-gun (JP); Noriaki Kuroda, Suntou-gun (JP); Noriko Nagamine, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/401,171

(22) Filed: Feb. 21, 2012

(65) Prior Publication Data

US 2012/0148306 A1   Jun. 14, 2012

Related U.S. Application Data

(63) Continuation of application No. PCT/JP2011/005263, filed on Sep. 16, 2011.

(30) Foreign Application Priority Data

Sep. 30, 2010   (JP) ................................ 2010-221810

(51) Int. Cl.
*G03G 15/02* (2006.01)
*B32B 9/04* (2006.01)
*B41L 9/00* (2006.01)

(52) U.S. Cl.
USPC ........... 399/168; 399/111; 399/176; 427/144; 427/387; 428/446; 428/451

(58) Field of Classification Search .................. 399/111, 399/168, 176; 427/144, 387; 428/226, 446, 428/451
See application file for complete search history.

(56) References Cited

U.S. PATENT DOCUMENTS

| 2010/0191001 | A1 | 7/2010 | Wassmer et al. |
| 2011/0217072 | A1 | 9/2011 | Kuroda et al. |
| 2012/0076535 | A1 | 3/2012 | Nagamine et al. |
| 2012/0082481 | A1 | 4/2012 | Nagamine et al. |
| 2012/0107565 | A1 | 5/2012 | Kuroda et al. |
| 2012/0121296 | A1 | 5/2012 | Kuroda et al. |

FOREIGN PATENT DOCUMENTS

| JP | 2001-305832 A | 11/2001 |
| JP | 2001-335700 A | 12/2001 |
| JP | 2002-080785 A | 3/2002 |
| JP | 2009-151159 A | 7/2009 |
| JP | 2009-151160 A | 7/2009 |
| WO | 2009/021766 A1 | 2/2009 |
| WO | 2012/042755 A1 | 4/2012 |
| WO | 2012/042765 A1 | 4/2012 |
| WO | 2012/042778 A1 | 4/2012 |

OTHER PUBLICATIONS

International Search Report in International Application No. PCT/JP2011/005263 (Oct. 2011).

*Primary Examiner* — D. S. Nakarani
(74) *Attorney, Agent, or Firm* — Fitzpatrick, Cella, Harper & Scinto

(57) ABSTRACT

To provide a charging member to the surface of which any toners and so forth can be kept from adhering and which can exhibit a stable charging performance. The charging member has a substrate, an elastic layer and a surface layer; the surface layer containing a high-molecular compound having an Si—O—B linkage and having a constitutional unit represented by the following formula (1) and a constitutional unit represented by the following formula (2).

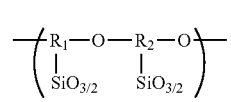

Formula (1)

$BO_{3/2}$   Formula (2)

8 Claims, 5 Drawing Sheets

CHARGING MEMBER AND PROCESS FOR ITS PRODUCTION

CROSS-REFERENCE TO RELATED APPLICATIONS

This application is a continuation of International Application No. PCT/JP2011/005263, filed Sep. 16, 2011, which claims the benefit of Japanese Patent Application No. 2010-221810, filed Sep. 30, 2010.

BACKGROUND OF THE INVENTION

1. Field of the Invention

This invention relates to a charging member used in electrophotographic apparatus, and a process for its production.

2. Description of the Related Art

In electrophotographic apparatus employing a contact charging system, it may come about that toners, external additives used in the toners, discharge products, paper dust and so forth adhere as a result of long-term service to the surface of a charging member provided in contact with an electrophotographic photosensitive member. Then, it has come about that the charging member the surface of which has come to be stained with such substances causes non-uniform charging on the electrophotographic photosensitive member and further makes electrophotographic images involve streaky defects caused by such non-uniform charging.

Japanese Patent Application Laid-open No. 2002-080785 discloses a conductive organic-inorganic hybrid film formed by a sol-gel process, which film is composed of an alkoxide of a metal and/or semimetal and an organosilicon compound and in which a conductive filler stands dispersed. Then, in this Japanese Patent Application Laid-open No. 2002-080785, it is noted that such a conductive organic-inorganic hybrid film has superior releasability to toners because it has a large contact angle to water.

SUMMARY OF THE INVENTION

However, the present inventors have, as a result of their studies, come to realize that a charging member having a surface to which toners and so forth can be more kept from adhering must be developed in order to meet the requirements for further improvement in running performance that are made on electrophotographic apparatus in recent years.

Accordingly, the present invention is directed to providing a charging member to the surface of which any toners and so forth can not easily adhere even because of long-term service and which can exhibit a stable charging performance over a long period of time, and provide a process for its production.

The present invention is also directed to providing an electrophotographic apparatus that can stably form high-grade electrophotographic images over a long period of time.

According to one aspect of the present invention, there is provided a charging member: comprising a substrate, an elastic layer; and a surface layer; wherein, the surface layer comprises a high-molecular compound having; an Si—O—B linkage; and a constitutional unit represented by the following formula (1) and a constitutional unit represented by the following formula (2).

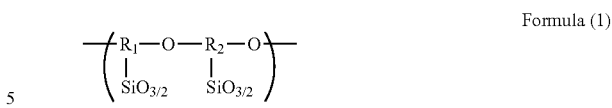

Formula (1)

Formula (2)

In the formula (1), $R_1$ and $R_2$ each independently represent any of structures represented by the following formulas (3) to (6).

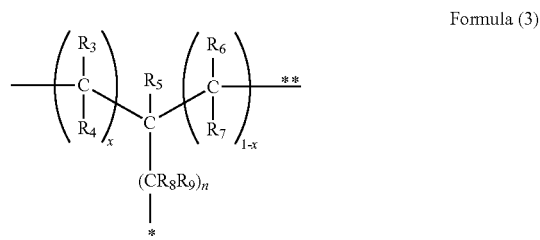

Formula (3)

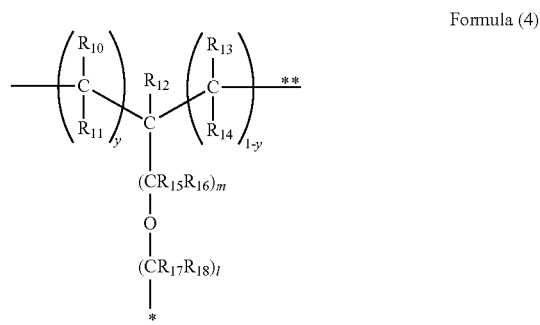

Formula (4)

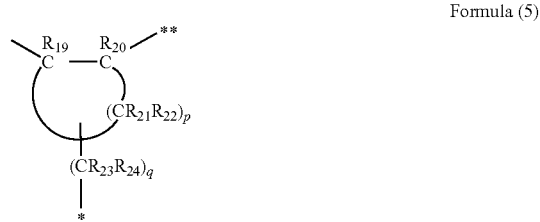

Formula (5)

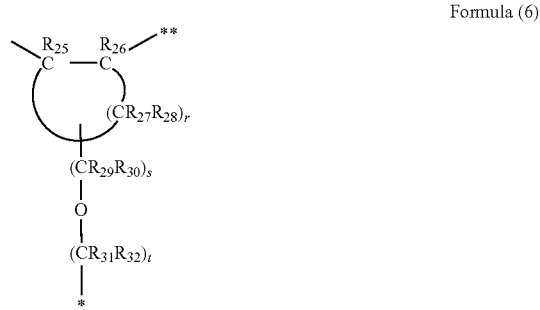

Formula (6)

In the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group or alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * and a double asterisk ** each represent the position of bonding with the silicon atom and oxygen atom, respectively, in the formula (1).

According to another aspect of the present invention, there is provided a process for producing the above charging member comprising the steps of; forming on the elastic layer a coating film of a coating material containing a hydrolyzed condensate synthesized from a hydrolyzable compound represented by the formula (11) shown later and a hydrolyzable compound represented by the formula (12) shown later; and cleaving epoxy groups of the hydrolyzed condensate to effect cross-linking of the hydrolyzed condensate to form the surface layer.

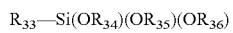  Formula (11)

  Formula (12)

where, in the formula (11), $R_{33}$ represents any structure selected from structures represented by the following formulas (13) to (16), each having an epoxy group; $R_{34}$ to $R_{36}$ each independently represent a hydrocarbon group; and, in the formula (12), $R_{37}$ to $R_{39}$ each independently represent a hydrocarbon group:

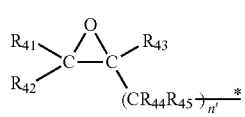  Formula (13)

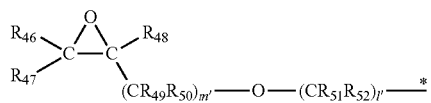  Formula (14)

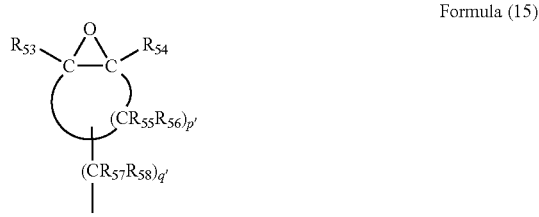  Formula (15)

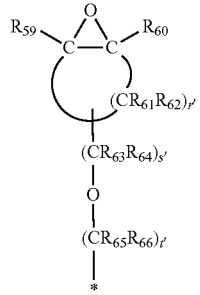  Formula (16)

where, in the formulas (13) to (16), $R_{41}$ to $R_{43}$, $R_{46}$ to $R_{48}$, $R_{53}$, $R_{54}$, $R_{59}$ and $R_{60}$ each independently represent a hydrogen atom, an alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represent a hydrogen atom or an alkyl group having 1 to 4 carbon atom(s); $R_{55}$, $R_{56}$, $R_{61}$ and $R_{62}$ each independently represent a hydrogen atom, an alkoxyl group having 1 to 4 carbon atom(s) or an alkyl group having 1 to 4 carbon atom(s); n', m', l', q', s' and t' each independently represent an integer of 1 to 8, and p' and r' each independently represent an integer of 4 to 12; and an asterisk * represents the position of bonding with the silicon atom in the formula (11). According to further aspect of the present invention, there is provided a process for producing the charging member comprising the steps of; forming on the elastic layer a coating film of a coating material containing a hydrolyzed condensate synthesized from the hydrolyzable compound represented by the afore-mentioned formula (11), the hydrolyzable compound represented by the afore mentioned formula (12) and the hydrolyzable compound represented by the following formula (17); and cleaving epoxy groups of the condensate to effect cross-linking of the hydrolyzed condensate to form the surface layer:

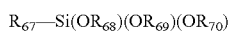  Formula (17)

where, in the formula (17), $R_{67}$ represents an alkyl group having 1 to 21 carbon atom(s) or an aryl group, and $R_{68}$ to $R_{70}$ each independently represent a hydrocarbon group.

According to still further aspect of the present invention, there is provided an electrophotographic apparatus comprising an electrophotographic photosensitive member and the above charging member, disposed in contact with the electrophotographic photosensitive member.

According to the present invention, it can make the charging member have sufficiently low surface free energy, and hence can provide a charging member to which any toners and so forth are kept from adhering and which can exhibit a stable charging performance over a long period of time.

According to the present invention, it can also provide an electrophotographic apparatus that can form high-grade electrophotographic images over a long period of time.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
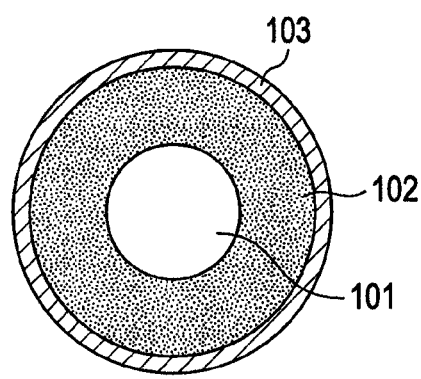
FIG. 1 is a view showing an example of the charging member of the present invention.

The charging member of the present invention has a substrate, a conductive elastic layer formed on the substrate and a surface layer formed on the conductive elastic layer. The simplest construction of the charging member of the present invention is the construction that the two layers, the conductive elastic layer and the surface layer, are provided on the substrate. One or two or more different layers may also be provided between the substrate and the conductive elastic layer and/or between the conductive elastic layer and the surface layer. In FIG. 1 showing a cross section of a roller-shaped charging member, a charging roller, reference numeral 101 denotes the substrate; 102, the conductive elastic layer; and 103, the surface layer.

Substrate:

As the substrate, a conductive substrate is used, which has electrical conductivity. Stated specifically, a substrate made of a metal (or made of an alloy) may be used which is formed of iron, copper, stainless steel, aluminum, an aluminum alloy or nickel.

Conductive Elastic Layer:

In the conductive elastic layer, one or two or more of elastic materials such as rubbers or thermoplastic elastomers may be used which are used in elastic layers (conductive elastic layers) of conventional charging members.

The rubbers may include the following: Urethane rubbers, silicone rubbers, butadiene rubbers, isoprene rubbers, chloroprene rubbers, styrene-butadiene rubbers, ethylene-propylene rubbers, polynorbornene rubbers, styrene-butadiene-styrene rubbers, acrylonitrile rubbers, epichlorohydrin rubbers and alkyl ether rubbers.

The thermoplastic elastomer may include, e.g., styrene type elastomers and olefin type elastomers. Commercially available products of the styrene type elastomers may include, e.g., RABARON, trade name, available from Mitsubishi Chemical Corporation, and SEPTON COMPOUND, trade name, available from Kuraray Co., Ltd. Commercially available products of the olefin type elastomers may include, e.g., THERMOLAN, trade name, available from Mitsubishi Chemical Corporation, MILASTOMER, trade name, available from Mitsui Petrochemical Industries, Ltd., SUMITOMO TPE, trade name, available from Sumitomo Chemical Co., Ltd., and SANTOPRENE, trade name, available from Advanced Elastomer Systems, L.P.

A conducting agent may also appropriately be used in the conductive elastic layer. This enables control of its conductivity at a stated value. The electrical resistance value of the conductive elastic layer may be controlled by appropriately selecting the type and amount of the conducting agent to be used. The conductive elastic layer may have an electrical resistance value of from $10^2 \Omega$ or more to $10^8 \Omega$ or less as a preferable range, and from $10^3 \Omega$ or more to $10^6 \Omega$ or less as a much preferable range.

The conducting agent used in the conductive elastic layer may include, e.g., cationic surface-active agents, anionic surface-active agents, amphoteric surface-active agents, antistatic agents and electrolytes.

The cationic surface-active agents may include, e.g., the following: Salts of quaternary ammoniums such as lauryl trimethylammonium, stearyl trimethylammonium, octadodecyl trimethylammonium, dodecyl trimethylammonium, hexadecyl trimethylammonium, and modified fatty acid dimethyl ethylammonium. The salts for the quaternary ammoniums may include, e.g., perchlorates, chlorates, tetrafluoroborates, ethosulfates and benzyl halides (such as benzyl bromide and benzyl chloride).

The anionic surface-active agents may include, e.g., aliphatic sulfonates, higher alcohol sulfates, higher alcohol ethylene oxide addition sulfates, higher alcohol phosphates, and higher alcohol ethylene oxide addition phosphates.

The antistatic agents may include, e.g., nonionic antistatic agents such as higher alcohol ethylene oxides, polyethylene glycol fatty esters, and polyhydric alcohol fatty esters.

The electrolytes may include, e.g., salts (such as quaternary ammonium salts) of metals belonging to Group 1 of the periodic table (such as Li, Na and K). The salts of metals belonging to Group 1 of the periodic table may specifically include $LiCF_3SO_3$, $NaClO_4$, $LiAsF_6$, $LiBF_4$, NaSCN, KSCN and NaCl.

As the conducting agent for the conductive elastic layer, also usable are salts (such as $Ca(ClO_4)_2$) of metals belonging to Group 2 of the periodic table (such as Ca and Ba), and antistatic agents derived therefrom. Still also usable are ion-conductive conducting agents such as complexes of any of these with polyhydric alcohols or derivatives thereof, and complexes of any of these with monools. The polyhydric alcohols may include 1,4-butanediol, ethylene glycol, polyethylene glycol, propylene glycol and polyethylene glycol. The monools may include ethylene glycol monomethyl ether and ethylene glycol monoethyl ether.

As the conducting agent for the conductive elastic layer, also usable are conductive carbons such as KETJEN BLACK EC, acetylene black, rubber-purpose carbon, color(ink)-purpose carbon having been treated by oxidation, and thermally decomposed carbon. Graphites such as natural graphite and artificial graphite may also be used as the conducting agent for the conductive elastic layer.

Metal oxides such as tin oxide, titanium oxide and zinc oxide and metals such as nickel, copper, silver and germanium may also be used as the conducting agent for the conductive elastic layer.

Conductive polymers such as polyaniline, polypyrrole and polyacetylene may still also be used as the conducting agent for the conductive elastic layer.

An inorganic or organic filler and a cross-linking agent may also be added to the conductive elastic layer.

The conductive elastic layer may preferably have an Asker-C hardness of 60 degrees or more to 85 degrees or less, and particularly from 70 degrees or more to 80 degrees or less, from the viewpoint of keeping the charging member from deforming when the charging member and the charging object member electrophotographic photosensitive member are brought into contact with each other.

The charging member may also preferably be in what is called a crown shape in which it is larger in thickness at the middle of the elastic layer than at its end portions.

Surface Layer:

The surface layer constituting the charging member of the present invention contains a high-molecular compound having an Si—O—B linkage, and the high-molecular compound has a constitutional unit represented by the following formula (1) and a constitutional unit represented by the following formula (2).

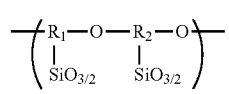

Formula (1)

Formula (2)

In the formula (1), $R_1$ and $R_2$ each independently represent any of structures represented by the following formulas (3) to (6).

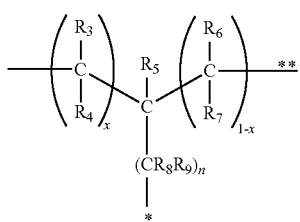

Formula (3)

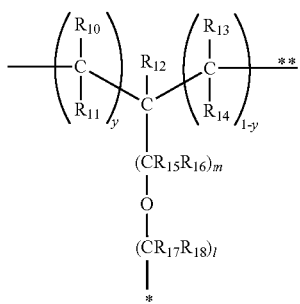

Formula (4)

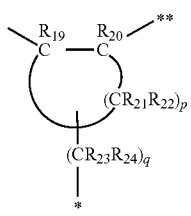

Formula (5)

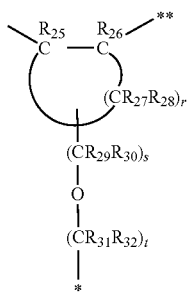

Formula (6)

In the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group or alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * and a double asterisk ** each represent the position of bonding with the silicon atom and oxygen atom, respectively, in the formula (1).

Figure 6A:
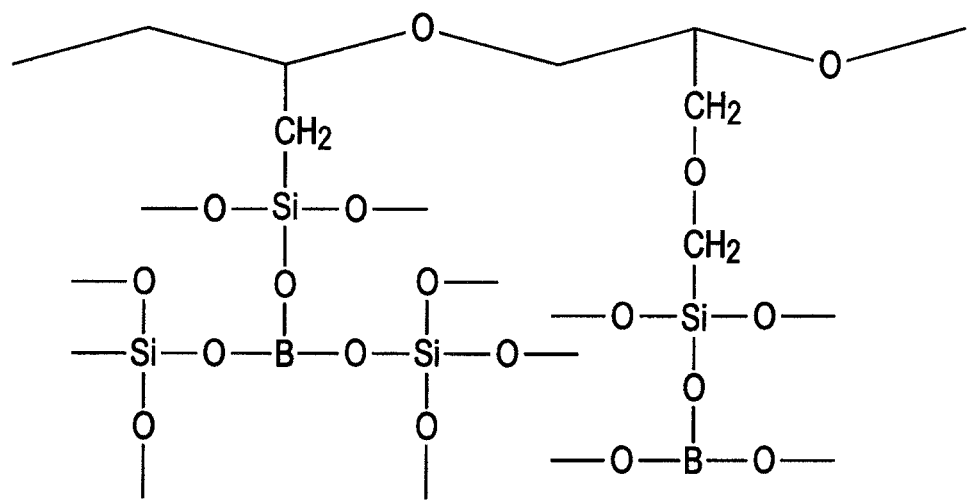
FIG. 6A is a view showing the chemical structure of a high-molecular compound according to the present invention.
Figure 6B:
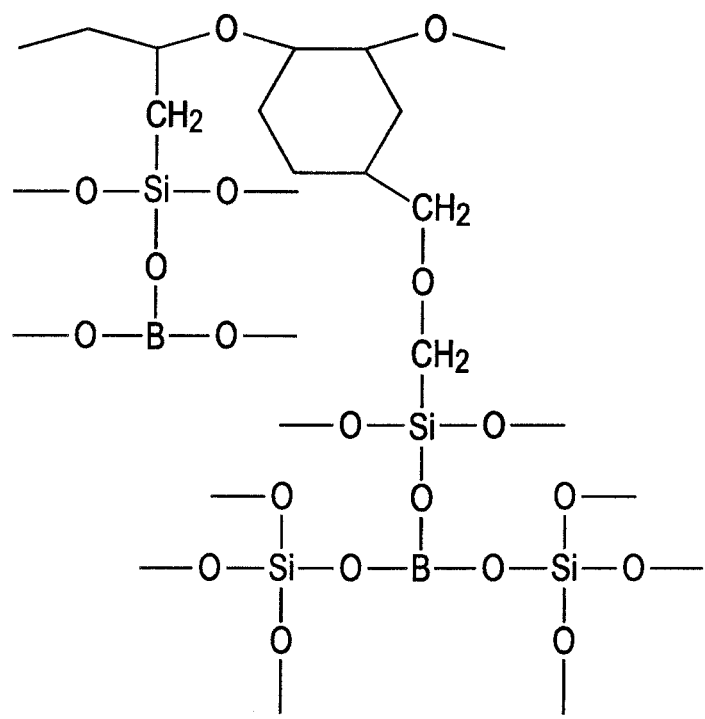
FIG. 6B is a view showing the chemical structure of a high-molecular compound according to the present invention.

As an example of the high-molecular compound according to the present invention, the high-molecular compound is so structured that $R_1$ in the formula (1) is the structure represented by the formula (3) and $R_2$ is the structure represented by the formula (4), part of which is shown in FIG. 6A. As another example of the high-molecular compound according to the present invention, it is so structured that $R_1$ in the formula (1) is the structure represented by the formula (3) and $R_2$ is the structure represented by the formula (6), part of which is shown in FIG. 6B.

The high-molecular compound according to the present invention has a high crosslink density because it has the structure wherein siloxane linkages and organic-chain moieties bonded to the silicon atoms stand polymerized one another. Hence, where the surface layer composed of such a high-molecular compound is formed on the elastic layer of the charging member, any low-molecular weight component in the elastic layer can effectively be kept from exuding to the surface of the charging member. In addition, that the high-molecular compound has the Si—O—B linkage in the molecule enables the charging member to have a low surface free energy. The surface layer may also have a layer thickness of approximately from 0.01 μm or more to 0.1 μm or less, and particularly from 0.02 μm or more to 0.09 μm or less.

As $R_1$ and $R_2$ in the formula (1) representing the unit in the high-molecular compound, these may preferably be any structures selected from structures represented by the following formulas (7) to (10). Making them have such structures can make the surface layer tougher and superior in durability. In particular, structures each having an ether group as represented by the following formulas (8) and (10) can make the surface layer more improved in its adherence to the elastic layer.

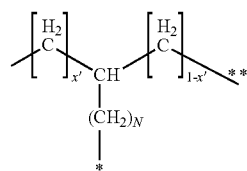

Formula (7)

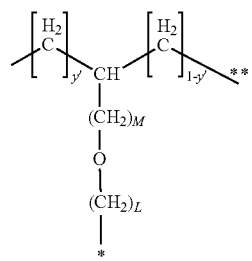

Formula (8)

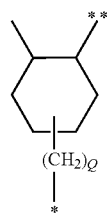

Formula (9)

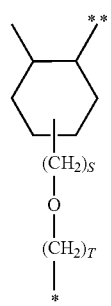

Formula (10)

In the formulas (7) to (10), N, M, L, Q, S and T each independently represent an integer of 1 or more to 8 or less, and x' and y' each independently represent 0 or 1.

In the high-molecular compound, the ratio of the number of atoms of boron to that of silicon, B/Si, may preferably be from 0.1 or more to 5.0 or less. As long as this value is 0.1 or more, the charging member can substantially have sufficiently low surface free energy. Also, as long as it is 5.0 or less, the coating performance of a surface layer coating solution can be stable.

Making-Up of Surface Layer:

The high-molecular compound according to the present invention is obtained by subjecting a hydrolyzable compound having a structure represented by the following formula (11) and a hydrolyzable compound having a structure represented by the following formula (12), to hydrolysis and dehydration condensation to obtain a condensate, and thereafter cleaving epoxy groups the condensate has, to effect cross-linking. Here, the degree of hydrolysis and condensation taking place at the trifunctional moiety of the formula (11) and the trifunctional moiety of the formula (12) may be controlled to control modulus of elasticity and denseness as film properties. Also, the organic-chain moiety of $R_{33}$ in the formula (11) may be used as a curing site. This enables control of the toughness of the surface layer and the adherence of the surface layer to the elastic layer. $R_{33}$ may also be set to be an organic group having an epoxy group capable of ring-opening by irradiation with ultraviolet rays. This can make curing time shorter than that for any conventional heat-curable materials, and can keep the surface layer from deteriorating thermally.

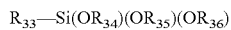

Formula (11)

Formula (12)

In the formula (11), $R_{33}$ represents any structure selected from structures represented by the following formulas (13) to (16), each having an epoxy group; and $R_{34}$ to $R_{36}$ each independently represent a hydrocarbon group. In the formula (12), $R_{37}$ to $R_{39}$ each also independently represent a hydrocarbon group.

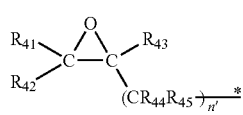

Formula (13)

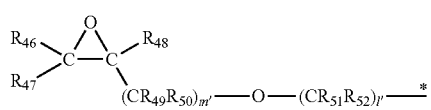

Formula (14)

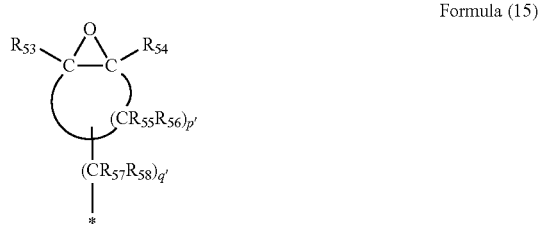

Formula (15)

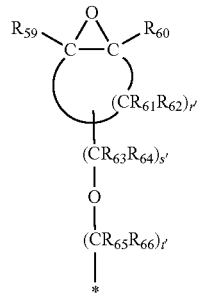

Formula (16)

In the formulas (13) to (16), $R_{41}$ to $R_{43}$, $R_{46}$ to $R_{48}$, $R_{53}$, $R_{54}$, $R_{59}$ and $R_{60}$ each independently represent a hydrogen atom, an alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represent a hydrogen atom or an alkyl group having 1 to 4 carbon atom(s); $R_{55}$, $R_{56}$, $R_{61}$ and $R_{62}$ each independently represent a hydrogen atom, an alkoxyl group having 1 to 4 carbon atom(s) or an alkyl group having 1 to 4 carbon atom(s); at least any two of carbon atoms in $R_{41}$, $R_{42}$, $R_{43}$ and $(CR_{44}R_{45})_{n'}$, at least any two of carbon atoms in $R_{46}$, $R_{47}$, $R_{48}$ and $(CR_{49}R_{50})_{m'}$, and, $R_{53}$ and $R_{54}$, and $R_{59}$ and $R_{60}$ may each combine to make a ring to form a cycloalkane; n', m', l', q', s' and t' each independently represent an integer of 1 to 8, and p' and r' each independently represent an integer of 4 to 12; and an asterisk * represents the position of bonding with the silicon atom in the formula (11).

The high-molecular compound according to the present invention may preferably be a cross-linked product of the hydrolyzable compounds represented by the formulas (11) and (12) and a hydrolyzable compound represented by the following formula (17). In this case, the solubility of the formulas (11) and (12) compounds in the stage of synthesis, the coating performance of a surface layer coating solution and the physical properties of a film having been cured can improve the surface layer in its electrical properties, as being preferable. In particular, a case in which $R_{67}$ is an alkyl group is preferable as being improved in the solubility and coating performance. A case in which $R_{67}$ is a phenyl group is also preferable as being contributory to an improvement in the electrical properties, in particular, volume resistivity.

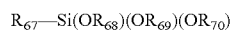

Formula (17)

In the formula (17), $R_{67}$ represents an alkyl group having 1 to 21 carbon atom(s) or an aryl group, and $R_{68}$ to $R_{70}$ each independently represent a hydrocarbon group.

The charging member according to the present invention may be obtained by forming on the elastic layer a coating film of a coating material containing the above hydrolyzed condensate, and thereafter subjecting the hydrolyzed condensate contained in the coating film, to cross-linking to form the above high-molecular compound therein to make the resultant film serve as the surface layer.

Production Example of High-Molecular Compound:

Here, as a production example of the high-molecular compound, how to prepare a surface layer coating solution (coating material) and how to form the high-molecular compound on the elastic layer to obtain the surface layer are specifically described. The high-molecular compound is produced through the following step (1) to step (6). In the following, a component (A) is the hydrolyzable silane compound represented by the formula (11), a component (B) is the hydrolyzable silane compound represented by the formula (17) and a component (C) is the hydrolyzable boron compound represented by the formula (12).

(1): The step of adjusting the molar ratio of components (A), (B) and (C), (C)/[(A)+(B)], to from 0.1 or more to 5.0 or less;
(2): the step of mixing the components (A) and (B), and then adding to the resultant mixture a component-(D) water and a component-(E) alcohol, followed by heating and reflux to effect hydrolysis condensation;
(3): the step of adding the component (C) to a solution obtained by effecting the hydrolysis condensation, to effect hydrolysis condensation;
(4): the step of adding a component-(F) photopolymerization initiator, and then diluting the resultant mixture with an alcohol to obtain a coating solution (coating material) containing a hydrolyzed condensate;
(5): the step of applying the coating solution onto the elastic layer formed on the substrate; and
(6): the step of subjecting the hydrolyzed condensate to crosslinking reaction to cure the coating solution.

Incidentally, the components (A), (B) and (C) may simultaneously be added in the step (2). Also, as to the hydrolyzable silane compounds, only one type of the component (A) may be used, and two or more types of the component (A) or two or more types of the component (B) may be used in combination.

The $R_{34}$ to $R_{36}$ hydrocarbon groups in the formula (11) may include, e.g., alkyl groups, alkenyl groups and aryl groups. Of these, straight-chain or branched-chain alkyl groups each having 1 to 4 carbon atom(s) are preferred, and further a methyl group, an ethyl group, a n-propyl group, an i-propyl group, a n-butyl group and a t-butyl group are much preferred.

Specific examples of the hydrolyzable silane compound having the structure represented by the formula (11) are shown below: 4-(1,2-Epoxybutyl)trimethoxysilane, 5,6-epoxyhexyltriethoxysilane, 8-oxysilan-2-yl octyltrimethoxysilane, 8-oxysilan-2-yl octyltriethoxysilane, 3-glycidoxypropyltrimethoxysilane, 3-glycidoxypropyltriethoxysilane, 1-(3,4-epoxycyclohexyl)ethyltrimethoxysilane, 1-(3,4-epoxycyclohexyl)ethyltriethoxysilane, 3-(3,4-epoxycyclohexyl)methyloxypropyltrimethoxysilane and 3-(3,4-epoxycyclohexyl)methyloxypropyltriethoxysilane.

As the $R_{67}$ alkyl group in the formula (17), a straight-chain alkyl group having 1 to 21 carbon atom(s) is preferred, and one having 6 to 10 carbon atom is further preferred. As the $R_{67}$ aryl group, a phenyl group is preferred. The $R_{68}$ to $R_{70}$ each hydrocarbon group may include, e.g., alkyl groups, alkenyl groups and aryl groups. Of these, straight-chain or branched-chain alkyl groups having 1 to 4 carbon atom(s) are preferred, and further a methyl group, an ethyl group, a n-propyl group, an i-propyl group, a n-butyl group and a t-butyl group are much preferred.

Specific examples of the hydrolyzable silane compound having the structure represented by the formula (17) are shown below: Methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, hexyltrimethoxysilane, hexyltriethoxysilane, hexyltripropoxysilane, decyltrimethoxysilane, decyltriethoxysilane, decyltripropoxysilane, phenyltrimethoxysilane, phenyltriethoxysilane and phenyltripropoxysilane.

Where the hydrolyzable silane compound having the structure represented by the formula (17) is used in combination and $R_{67}$ is a phenyl group, it may much preferably be used in combination with a hydrolyzable silane compound in which $R_{67}$ is a straight-chain alkyl group having 6 to 10 carbon atoms. Its use in combination makes the compounds improved in compatibility with the solvent even when their structures change through the hydrolysis condensation reaction.

The $R_{37}$ to $R_{39}$ hydrocarbon groups in the formula (12) may include, e.g., alkyl groups, alkenyl groups and aryl groups. Of these, straight-chain or branched-chain alkyl groups each having 1 to 4 carbon atom(s) are preferred, and further a methyl group, an ethyl group, a n-propyl group, an i-propyl group, a n-butyl group and a t-butyl group are much preferred.

Specific examples of the hydrolyzable boron compound having the structure represented by the formula (12) are shown below: Boron methoxide, boron ethoxide, boron methoxyethoxide, boron n-propoxide, boron i-propoxide, boron n-butoxide, boron t-butoxide, and boron allyloxide.

The molar ratio of the components (A), (B) and (C), B/Si, may preferably be adjusted to from 0.1 or more to 5.0 or less, and much preferably from 0.5 or more to 3.0 or less. This makes make the surface layer have much lower surface free energy, and brings a more improvement in the effect of keeping any stains from adhering to the surface. This also stabilizes the coating performance of a surface layer forming coating solution.

As to the amount of the component-(D) water to be added, it may preferably be from 0.3 or more to 6.0 or less as the value of (D)/[(A)+(B)], based on the number of moles of the components (A) and (B). It may much preferably be from 1.2 or more to 1.8 or less. As long as it is 0.3 or more, the condensation may sufficiently proceed, and there can not easily remain any unreacted residual monomers, promising good film-forming properties. A system where any monomers do not remain is desirable also from the viewpoint of effective use of raw materials. Also, as long as it is 6.0 or less, the condensation may by no means proceed too rapidly, and the condensate can be prevented from becoming milky or precipitating. In addition, the condensate may by no means contain too much water and hence may by no means be of too high polarity, so that this promises a good compatibility when the condensate is mixed with water and an alcohol, and hence the condensate can be prevented from becoming milky or precipitating.

As the component-(E) alcohol, it is preferable to use a primary alcohol, a secondary alcohol, a tertiary alcohol, a mixed system of a primary alcohol and a secondary alcohol, or a mixed system of a primary alcohol and a tertiary alcohol. It is particularly preferable to use ethanol, a mixed solvent of methanol and 2-butanol, a mixed solvent of ethanol and 2-butanol, or a mixed solvent of 2-butanol and 1-butanol.

As the component-(F) photopolymerization initiator, it is preferable to use an onium salt of Lewis acid or Brønsted acid. Other cationic polymerization initiator may include, e.g., borate salts, compounds having an imide structure, compounds having a triazine structure, azo compounds and peroxides.

The photopolymerization initiator may preferably beforehand be diluted with a solvent such as an alcohol or a ketone so as to be improved in compatibility with the coating solution.

Among such various cationic polymerization initiators, an aromatic sulfonium salt or an aromatic iodonium salt is preferred from the viewpoint of sensitivity, stability and reactivity. In particular, a bis(4-tert-butylphenyl) iodonium salt, a compound having a structure represented by the following formula (18) (trade name: ADECAOPTOMER SP150; available from Asahi Denka Kogyo K.K.) and a compound having a structure represented by the following formula (19) (trade name: IRGACURE 261; available from Ciba Specialty Chemicals Inc.) are preferred.

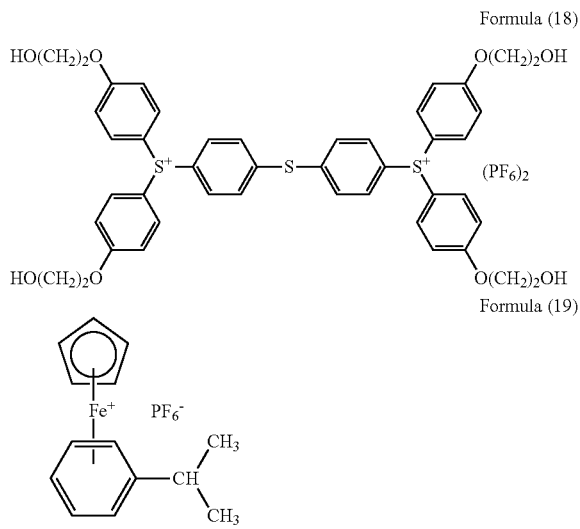

Formula (18)

Formula (19)

The coating solution synthesized as above is controlled to have a concentration suited for its actual coating. On this occasion, besides the hydrolyzed condensate, any suitable solvent may be used in order to improve coating performance. Such a suitable solvent may include, e.g., alcohols such as methanol, ethanol and butanol, ethyl acetate, and ketones such as methyl ethyl ketone and methyl isobutyl ketone, or a mixture of any of these. In particular, ethanol or a mixed solvent of 2-butanol and 1-butanol is preferred.

Formation of Surface Layer:

The coating solution having been prepared in this way is coated on the elastic layer by a method such as coating making use of a roll coater, dip coating or ring coating, to form a coating layer. The coating layer is irradiated with activated-energy rays, whereupon cationic-polymerizable groups in the hydrolyzed condensate contained in the coating solution undergo cleavage and polymerization. This causes molecules of the hydrolyzed condensate to cross-link one another to come cured, thus the surface layer is formed. As the activated-energy rays, ultraviolet rays are preferred.

The curing of the surface layer with ultraviolet rays makes any excess heat not easily generated, and any phase separation that may come during volatilization of a solvent as in heat curing can not easily occur, thus a uniform film state is obtained. This enables the photosensitive member to be provided with uniform and stable potential. Also, as long as the cross-linking reaction is carried out by ultraviolet radiation, the elastic layer can be kept from its deterioration due to heat history, and hence the elastic layer can also be kept from lowering in its electrical properties.

In the irradiation with ultraviolet rays, usable are a high-pressure mercury lamp, a metal halide lamp, a low-pressure mercury lamp, an excimer UV lamp and the like. Of these, an ultraviolet radiation source may be used which is rich in light of from 150 nm or more to 480 nm or less in wavelength of ultraviolet rays.

Here, integral light quantity of ultraviolet radiation is defined as shown below.

Ultraviolet radiation integral light quantity (mJ/cm$^2$)=ultraviolet radiation intensity (mW/cm$^2$)×irradiation time (s).

The integral light quantity of ultraviolet radiation may be controlled by selecting irradiation time, lamp output, and distance between the lamp and the irradiation object. The integral light quantity may also be sloped within the irradiation time.

Where the low-pressure mercury lamp is used, the integral light quantity of ultraviolet radiation may be measured with an ultraviolet radiation integral light quantity meter UIT-150-A or UVD-S254 (both are trade names), manufactured by Ushio Inc. Where the excimer UV lamp is used, the integral light quantity of the ultraviolet radiation may also be measured with an ultraviolet radiation integral light quantity meter UIT-150-A or VUV-S172 (both are trade names), manufactured by Ushio Inc.

Figure 5:
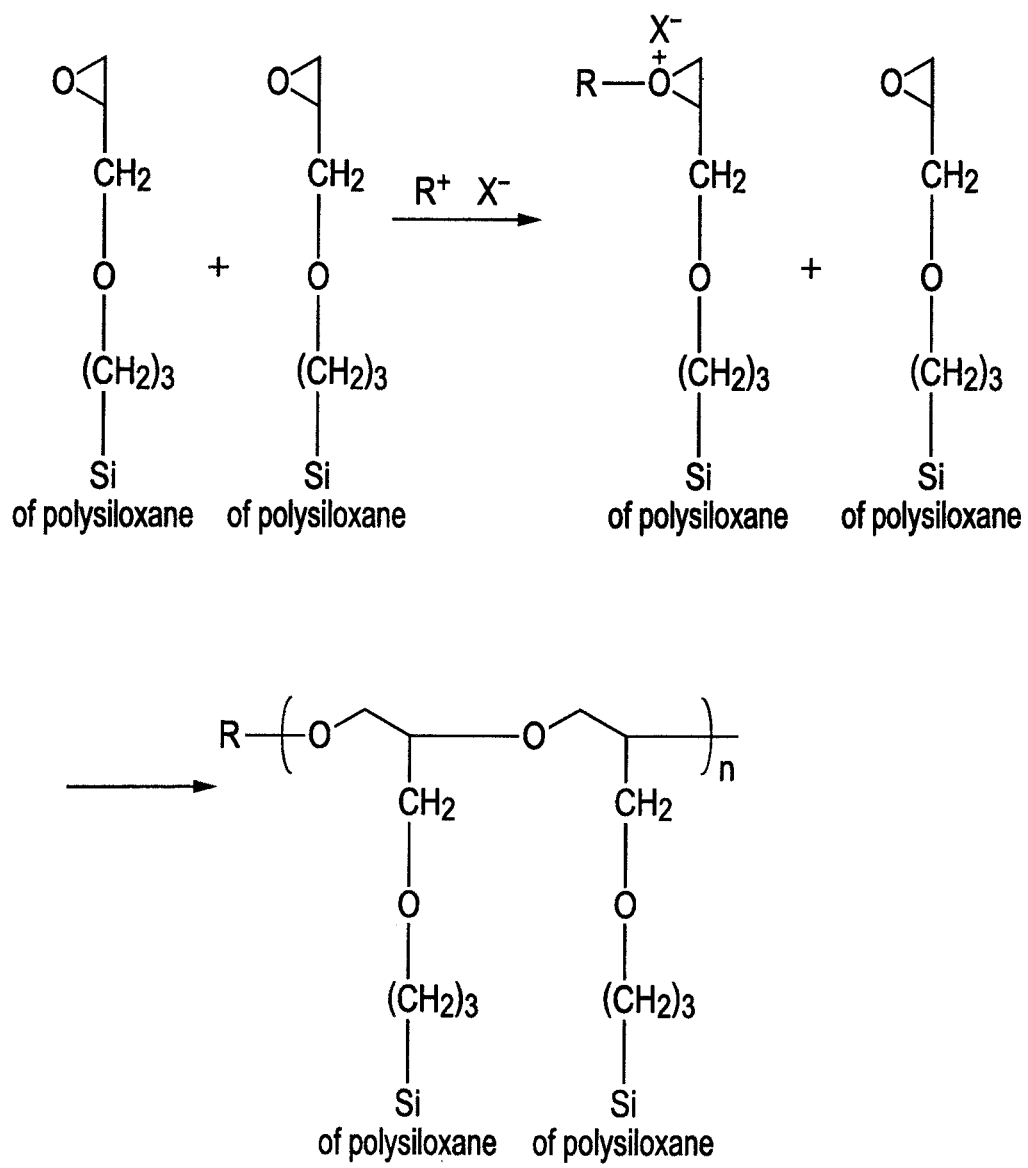
FIG. 5 is an illustration of cross-linking reaction in the step of forming the surface layer according to the present invention.

About the cross-linking and curing reaction that takes place in the course where the high-molecular compound according to the present invention is formed, it is described with reference to FIG. 5.

For example, the condensate obtained by hydrolyzing 3-glycidoxypropyltrimethoxysilane as the component (A) described previously and the hydrolyzable boron compound as the component (C) has epoxy groups as cationic-polymerizable groups. The epoxy groups of such a hydrolyzed condensate undergo ring-opening of epoxy rings in the presence of a cationic polymerization catalyst (represented as $R^+X^-$ in FIG. 5), and the polymerization proceeds chain-reactingly. As the result, molecules of a polysiloxane containing $BO_{3/2}$ cross-link one another to come cured, thus the high-molecular compound according to the present invention is formed. In FIG. 5, n represents an integer of 1 or more.

The surface layer may preferably have a thickness of 0.01 μm to 0.1 μm as a guide. The thickness in the numeral range enables a more homogeneous surface layer to be formed.

Figure 2:
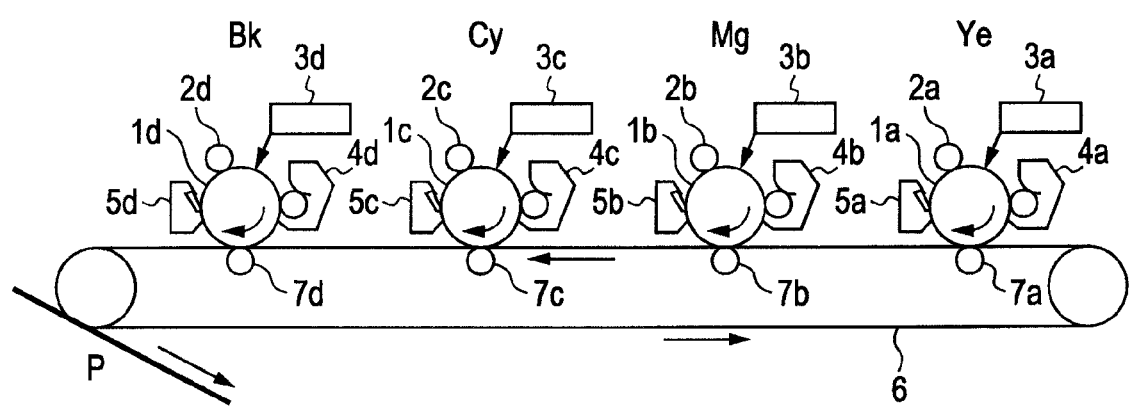
FIG. 2 is a schematic structural view of an electrophotographic apparatus having the charging member of the present invention.

Image Forming Apparatus:

An example of the structure of an electrophotographic apparatus provided with a process cartridge having the charging member of the present invention is schematically shown in FIG. 2.

As shown in FIG. 2, photosensitive drums 1a to 1d set opposite to developing means 4a to 4d, respectively, such as developing assemblies holding respective-color toners therein are provided in a line in the direction of movement of an intermediate transfer belt 6. Respective-color toner images formed on the respective photosensitive drums by the respective developing means are sequentially superimposingly transferred electrostatically onto the intermediate transfer belt by transfer rollers 7a to 7d, so that a full-color toner image composed of four-color toners of yellow, magenta and cyan and black added thereto. Charging means 2a to 2d, exposure means 3a to 3d and developing means 4a to 4d which are for forming the respective-color toner images on the respective photosensitive drums are also provided around the respective photosensitive drums 1a to 1d. Cleaning units 5a to 5d are further provided which have cleaning blades with which any toners remaining on the respective photosensitive drums are collected by rubbing, after the toner images have been transferred to the intermediate transfer belt.

How image formation is operated is described next. The surfaces of the photosensitive drums 1a to 1d having uniformly electrostatically been charged by means of charging rollers which are the charging means 2a to 2d are irradiated by the exposure means 3a to 3d, with laser beams modulated in accordance with image data sent from a host processing unit such as a personal computer, and the desired electrostatic latent images corresponding to the respective colors are obtained. These latent images are reverse-developed at developing positions by means of the developing means 4a to 4d which are the developing assemblies holding respective-color toners therein, and are rendered visible as the toner images. These toner images are sequentially transferred at the respective transfer positions to the intermediate transfer belt 6, and then transferred in block to a transfer material P which is fed at a stated timing by a paper feed means (not shown) and come transported by a transport means. The full-color toner image on this transfer material P is fused by heating by means of a fixing assembly (not shown) and permanently fixed on the transfer medium, thus the desired full-color print image is obtained.

Here, in order to improve the efficiency of transfer of the toner images from the photosensitive drums to the intermediate transfer belt, a system is conventionally proposed in which a difference in speed is put between the peripheral speed of the photosensitive drums and the peripheral speed of the intermediate transfer belt at the respective transfer positions. According to this system, it brings an improvement in transfer efficiency of the respective-color toner images, and can be a very effective method when two- or more-color toner images are superimposingly transferred. In particular, in a four-color full-color mode, putting the difference in peripheral speed between the photosensitive drums and the intermediate transfer belt can prevent any blank-area phenomenon to improve the transfer efficiency to obtain good images free of any color tint variations. Here, the blank-area phenomenon refers to a phenomenon that the toner images transferred from the photosensitive drums to the intermediate transfer belt have blank areas unwantedly.

In an electrophotographic-system color image forming apparatus, the apparatus is also so set up that, not only the full-color mode that forms full-color toner images by using four-color toners, but also a monochrome mode that forms black-and-white images by using only the photosensitive drum for black toner can be chosen and can be switched from the former.

To describe the matter in greater detail, electrophotographic photosensitive members (the photosensitive drums) are rotatingly driven clockwise as shown by arrows and at a stated peripheral speed (process speed). The process speed is variable. As the electrophotographic photosensitive members, any known electrophotographic photosensitive members may be employed which, e.g., each have a cylindrical support having an electrical conductivity and provided on the support a photosensitive layer containing an inorganic photosensitive material or organic photosensitive material. Also, the electrophotographic photosensitive members may each further have a charge injection layer for charging the former to stated polarity and potential.

Charging rollers that are the charging members (charging means) are kept in contact with the electrophotographic photosensitive members at a stated pressing force and, in the present apparatus, rotatingly driven in the direction that follows the rotation of the electrophotographic photosensitive members. To the charging rollers each, only a stated DC voltage (−1,050 V in this example) is applied from a voltage applying means, whereby the surfaces of the electrophotographic photosensitive members are uniformly charge-processed to stated polarity and potential (to a dark-area potential of −500 V in this example).

As the exposure means, any known means may be used, which may include, e.g., laser beam scanners. The charge-processed surfaces of the electrophotographic photosensitive members are put to imagewise exposure corresponding to the intended image information, whereupon the potential (light-area potential of −100 V in this example) lowers (attenuates) selectively, so that the electrostatic latent images are formed on the electrophotographic photosensitive members.

As the developing means, any known means may be used. For example, the developing means in this example are provided at openings of developer containers holding the toners therein and are each so set up as to have a toner carrying member, an agitator which agitates the toners held in the container, and a toner coat control member which controls toner coat level (toner layer thickness) on the toner carrying member.

The developing means make the toners adhere selectively to the exposed light areas of the electrostatic latent images on the surfaces of the electrophotographic photosensitive members to render the electrostatic latent images visible as the toner images; the toners (negative toners) standing charged (at a development bias of −350 V in this example) to the same polarity as that of charge polarity of the electrophotographic photosensitive members. As a developing system therefor, there are no particular limitations thereon, and any existing system may be used. As the existing system, a jumping developing system, a contact developing system, a magnetic-brush developing system or the like is available. In particular, in the full-color electrophotographic apparatus that reproduces full-color toner images, the contact developing system is preferable for the purpose of, e.g., remedying the disposition of toner scattering.

As a toner carrying member used in the contact developing system, it may preferably make use of a compound having elasticity, such as rubber, in view of the securing of contact stability. For example, it may include a developing roller comprising a support made of a metal or the like and, provided thereon, an elastic layer to which electrical conductivity has been imparted. For this elastic layer, a foam obtained by expansion molding of a resilient material may be used as an elastic material. The elastic layer may further be provided thereon with a layer or may be subjected to surface treatment. The surface treatment may include surface processing making use of ultraviolet rays or electron rays, and surface modification in which a compound or the like is made to adhere to the surface or impregnated into the surface layer.

As the intermediate transfer belt, any known means may be used, which may be exemplified by a conductive belt made from a resin and an elastomer in which conductive fine particles or the like have been incorporated so as to be controlled to have a medium resistance.

As the transfer roller as the transfer means, any known means may be used, which may be exemplified by a transfer roller comprising a support made of a metal or the like and covered thereon an elastic resin layer having been controlled to have a medium resistance. The transfer roller is brought into contact with the electrophotographic photosensitive member at a stated pressing force, interposing the intermediate transfer belt between them, to form a transfer nip, and is rotated at substantially the same peripheral speed as the rotational peripheral speed of the electrophotographic photosensitive member in the direction following the rotation of the electrophotographic photosensitive member. A transfer voltage having a polarity reverse to the charge characteristics of the toner is also applied from a transfer bias applying means.

Residues such as transfer residual toner are collected from the surface of the electrophotographic photosensitive member by a cleaning means of a blade type or the like. Thereafter, the electrophotographic photosensitive member is again electrostatically charged by means of the charging roller to form images repeatedly thereon.

The electrophotographic apparatus of this example may be an apparatus having a process cartridge (not shown) in which the electrophotographic photosensitive member and the charging roller are integrally supported with a support member such as a resin molded product and which is so set up as to be detachably mountable to the main body of the electrophotographic apparatus as it is so integrally set up. It may further be a process cartridge in which, not only the electrophotographic photosensitive member and the charging roller, the developing means and the cleaning means are also integrally supported together.

EXAMPLES

The present invention is described below in greater detail by giving specific working examples. In the following working examples, "part(s)" refers to "part(s) by mass".

Example 1

(1) Formation and Evaluation of Conductive Elastic Layer

Materials shown in Table 1 were mixed by means of a 6-liter pressure kneader (equipment used: TD6-15MDX; manufactured by Toshin Co., Ltd.) for 24 minutes in a packing of 70 vol. % and at a number of blade revolutions of 30 rpm to obtain an unvulcanized rubber composition. To 174 parts by mass of this unvulcanized rubber composition, 4.5 parts of tetrabenzylthiuram disulfide (trade name: SANCELER TBzTD; available from Sanshin Chemical Industry Co., Ltd.) as a vulcanization accelerator and 1.2 parts of sulfur as a vulcanizing agent were added. Then, these were mixed by means of an open roll of 12 inches in roll diameter at a number of front-roll revolutions of 8 rpm and a number of back-roll revolutions of 10 rpm and at a roll gap of 2 mm, carrying out right and left 20 cuts in total. Thereafter, the roll gap was changed to 0.5 mm to carry out tailing 10 times to obtain a kneaded product 1 for elastic layer.

TABLE 1

| Raw materials | Amount |
|---|---|
| Medium/high-nitrile NBR (trade name: NIPOL DN219; bound acrylonitrile content center value: 33.5%; Mooney viscosity center value: 27; available from Nippon Zeon Co., Ltd.) | 100 parts |
| Carbon black for color (filler) (trade name: TOKA BLACK #7360SB; particle diameter: 28 nm; nitrogen adsorption specific surface area: 77 $m^2/g$; DBP oil absorption: 87 $cm^3/100$ g; available from Tokai Carbon Co., Ltd.) | 48 parts |
| Calcium carbonate (filler) (trade name: NANOX #30; available from Maruo Calcium Co., Ltd.) | 20 parts |
| Zinc oxide | 5 parts |
| Stearic acid | 1 part |

Next, a substrate made of steel (one having been surface-plated with nickel; hereinafter "mandrel") in a columnar shape of 6 mm in diameter and 252 mm in length was readied. Then, this mandrel was coated with a metal- and rubber-containing heat-hardening adhesive (trade name: METALOC U-20, available from Toyokagaku Kenkyusho Co., Ltd.) over the areas up to 115.5 mm from the both sides interposing the middle of the column surface in the axial direction (the areas of 231 mm in total in width in the axial direction). The wet coating thus formed was dried at 80° C. for 30 minutes, and thereafter further dried at 120° C. for 1 hour.

The kneaded product 1 was extruded simultaneously with the above mandrel with adhesive layer while being shaped coaxially around the mandrel and in the shape of a cylinder of 8.75 mm to 8.90 mm in diameter, by extrusion making use of a cross head. The extruded product obtained was cut at its end portions to produce a conductive elastic roller the mandrel of which was covered on the outer periphery thereof with an unvulcanized conductive elastic layer. As an extruder, an extruder having a cylinder diameter of 70 mm and an L/D of 20 was used, making temperature control to 90° C. for its head, cylinder and screw at the time of extrusion.

Next, the above roller was vulcanized by using a continuous heating oven having two zones set at different temperatures. A first zone was set at a temperature of 80° C., where the roller was passed therethrough in 30 minutes, and a second zone was set at a temperature of 160° C. and the roller was passed therethrough also in 30 minutes, to obtain a vulcanized conductive elastic roller.

Next, this conductive elastic roller was cut at its both ends of the conductive elastic layer portion (rubber portion) to make the conductive elastic layer portion have a width of 232 mm in the axial direction. Thereafter, the surface of the conductive elastic layer portion was sanded with a rotary grinding wheel (number of work revolutions: 333 rpm; number of grinding wheel revolutions: 2,080 rpm; sanding time: 12 seconds). Thus, a conductive elastic roller 1 (conductive elastic roller having been surface-sanded) was obtained which had a crown shape of 8.26 mm in diameter at end portions and 8.50 mm in diameter at the middle portion, having a surface ten-point average roughness Rz of 5.5 μm, having a run-out of 18 μm and having a hardness (Asker-C) of 73 degrees.

The ten-point average roughness Rz was measured according to JIS B 6101. The run-out was measured with a high-precision laser measuring instrument LSM-430V, manufactured by Mitutoyo Corporation. Stated in detail, the outer diameter was measured with the measuring instrument, and the difference between a maximum outer diameter value and a minimum outer diameter value was regarded as outer-diameter difference run-out. This measurement was made at five spots, and an average value of outer-diameter difference run-out at five spots was regarded as the run-out of the measuring object. The Asker-C hardness was measured in a measurement environment of 25° C./55% RH under conditions of a load of 1,000 g, bringing a loaded needle of an Asker-C hardness meter (manufactured by Koubunshi Keiki Co., Ltd.) into touch with the surface of the measuring object.

(2) Synthesis and Evaluation of Condensate

Condensate 1

Next, a condensate 1 was synthesized through the following two-stage reaction.

Synthesis 1: First-Stage Reaction

Components shown in Table 2 below were mixed, and thereafter stirred at room temperature for 30 minutes. Subsequently, heating and reflux were carried out at 120° C. for 20 hours by using an oil bath, to obtain a condensate intermediate 1 of the hydrolyzable silane compounds. The synthesis concentration at this stage was 28.0% by mass as solid content (the mass ratio to solution total weight when the hydrolyzable compounds were assumed to have undergone dehydration condensation in their entirety).

TABLE 2

| | |
|---|---|
| Glycidoxypropyltrimethoxysilane (GPTMS, simply "EP-1") (hydrolyzable silane compound; trade name: KBM-403; available from Shin-Etsu Chemical Co., Ltd.) | 11.56 g (0.049 mol) |
| Hexyltrimethoxysilane (HeTMS, simply "He") (hydrolyzable silane compound; trade name: KBM-3063; available from Shin-Etsu Chemical Co., Ltd.) | 62.11 g (0.302 mol) |
| Ion-exchanged water | 11.34 g |
| Ethanol (guaranteed; available from Kishida Chemical Co., Ltd.) | 91.87 g |

Synthesis 2: Second-Stage Reaction

Next, to 137.21 g of the condensate intermediate 1, 39.59 g (0.272 mol) of boron ethoxide (hereinafter simply "B-1"; available from Gelest, Inc.;) was added, and these were stirred at room temperature for 3 hours to obtain a liquid condensate of the hydrolyzable silane compounds and a hydrolyzable boron compound. This is designated as a condensate 1. Incidentally, a sequence of stirring was carried out at a speed of 750 rpm. Also, the number ratio of boron atoms to silicon atoms, B/Si, in the condensate 1-1 was 1.0.

Evaluation (1): Stability of Condensate 1.

The stability of the condensate 1 was evaluated according to the following evaluation criteria.

A: The condensate stands neither milky nor precipitating even after its leaving for a month.
B: The condensate comes to stand a little milky after its leaving for about two weeks.
C: The condensate comes to stand a little milky after its leaving for about one week.
D: The condensate comes to stand milky or precipitating during its synthesis.

Evaluation (2): Confirmation of Structure of Formula (1) in Cured Film of Condensate 1.

It was confirmed by $^{29}$Si-NMR and $^{13}$C-NMR measurement whether or not the structure represented by the formula (1) was present (instrument used: JMN-EX400, manufactured by JEOL Ltd.). How to prepare a sample for the measurement is described below.

First, an aromatic sulfonium salt (trade name: ADECAOP-TOMER SP150; available from Asahi Denka Kogyo K.K.) as a cationic photopolymerization initiator was diluted with methanol to 10% by mass. Then, 0.7 g of the ethanol dilute solution of the cationic polymerization initiator was added to 25 g of the condensate 1-1. This is designated as a condensate 1-1.

The condensate 1-1 was controlled to have a theoretical solid-matter concentration of 7.0% by mass by adding thereto a solvent prepared by mixing ethanol and 2-butanol in an amount equal to each other, to obtain a coating solution 1. Next, this coating solution 1 was spin-coated on the defatted surface of a sheet made of aluminum, having a thickness of 100 μm. As a spin coating equipment, 1H-D7 (trade name; manufactured by Mikasa Co., Ltd.). The spin coating was carried out under conditions of a number of revolutions of 300 rpm and a revolution time of 2 seconds.

Then, the coating of the coating solution 1 was dried, and thereafter the coating film formed was irradiated with ultraviolet rays of 254 nm in wavelength to cure the coating film. The ultraviolet rays with which the coating film was irradiated were in an integral light quantity of 9,000 mJ/cm$^2$. In the irradiation with ultraviolet rays, a low-pressure mercury lamp (manufactured by Harison Toshiba Lighting Corporation) was used.

Next, the cured film formed was peeled from the sheet made of aluminum, and then pulverized by using a mortar made of agate, to prepare the sample for NMR the measurement. This sample was measured for its $^{29}$Si-NMR spectrum and $^{13}$C-NMR spectrum by using a nuclear magnetic resonance instrument (trade name; JMN-EX400, manufactured by JEOL Ltd.).

Figure 3:
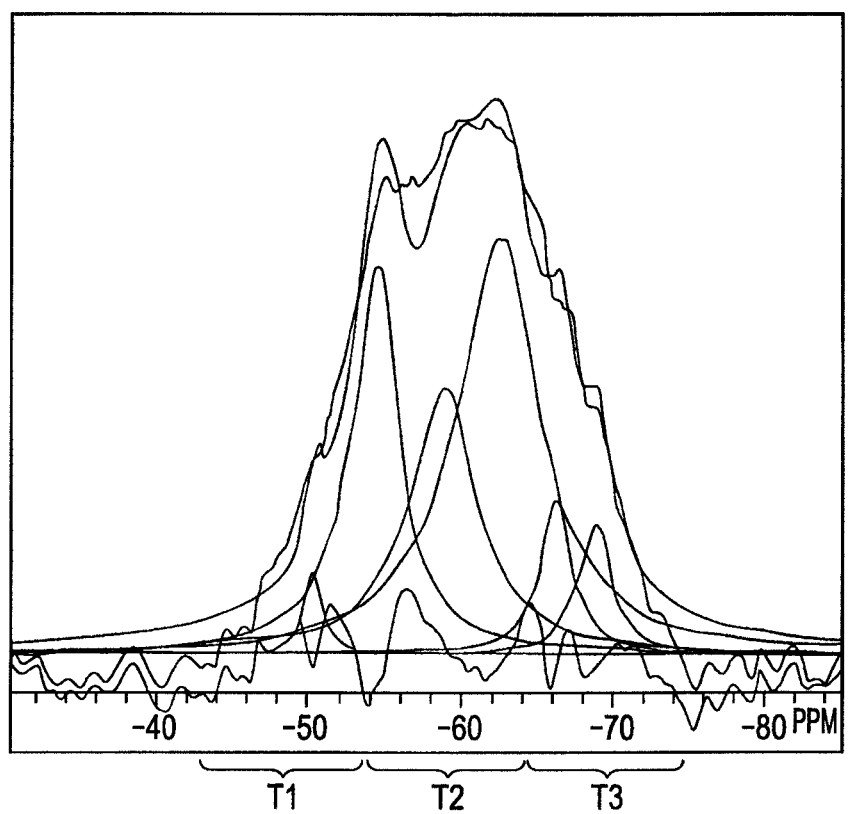
FIG. 3 is a chart showing an example of measurement by $^{29}$Si-NMR of a surface-layer composition in the present invention.

A $^{29}$Si-NMR spectrum is shown in FIG. 3. In the same figure, peaks formed by waveform separation of the spectrum are shown together. A peak in the vicinities of −64 ppm to −74 ppm shows a T3 component. Here, the T3 component shows a state in which the Si having one bond with an organic functional group has three bonds with the other atoms (Si and B) through the O, i.e., —SiO$_{3/2}$. It was confirmed from FIG. 3 that there was a species present in the state of —SiO$_{3/2}$ upon condensation of a hydrolyzable silane compound having organic chains containing epoxy groups.

Figure 4:
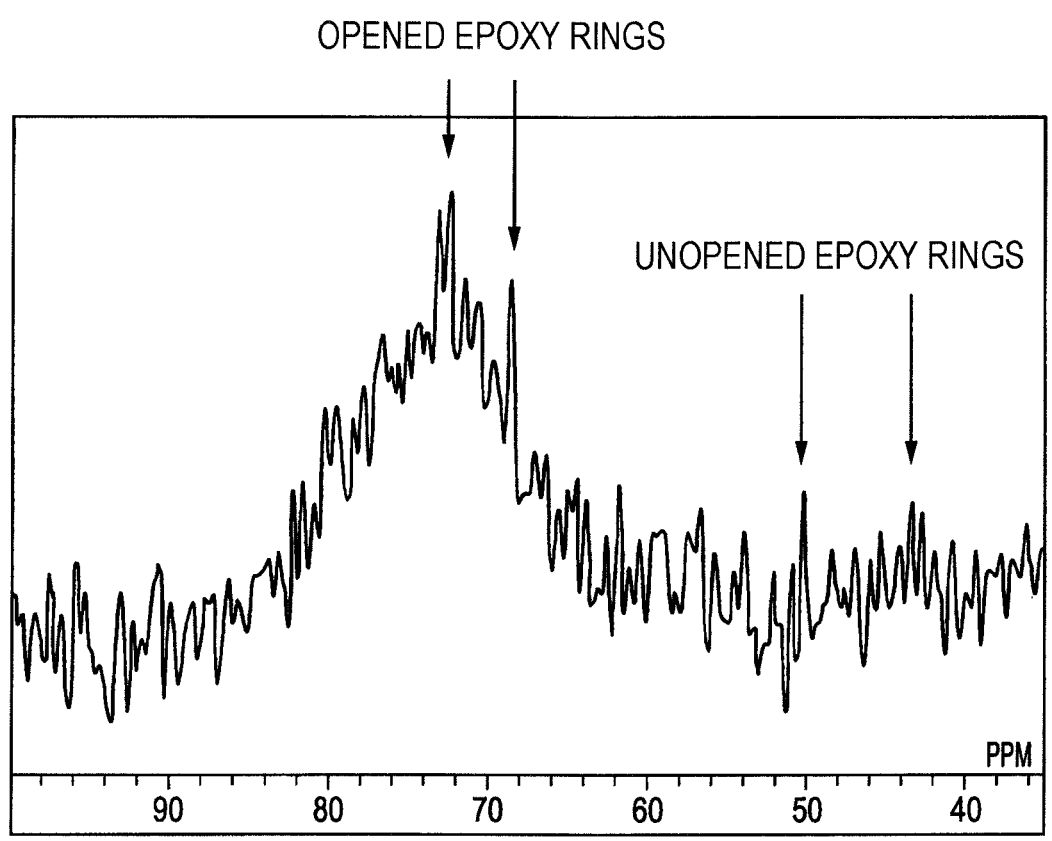
FIG. 4 is a chart showing an example of measurement by $^{13}$C-NMR of a surface-layer composition in the present invention.

A $^{13}$C-NMR spectrum is also shown in FIG. 4. Peaks showing epoxy groups before ring-opening appear in the vicinities of 44 ppm and 51 ppm, and peaks after ring-opening polymerization appear in the vicinities of 69 ppm and 72 ppm. It was confirmed from FIG. 4 that the polymerization was effected almost without any unopened epoxy groups remaining.

It was confirmed from the above $^{29}$Si-NMR and $^{13}$C-NMR measurement that the structure represented by the formula (1) was present in the cured product of the condensate 1.

(3) Production and Evaluation of Charging Rollers 1-1 to 1-7

Preparation of Surface Layer Forming Coating Materials 1-1 to 1-7

The condensate 1-1 was controlled to have a solid-matter concentration of 1.0% by mass, 0.1% by mass 0.2% by mass, 0.5% by mass, 3.5% by mass, 4.0% by mass and 5.0% by mass each by using a 1:1 (mass ratio) ethanol/2-butanol mixed solvent, to obtain surface layer forming coating materials. These surface layer forming coating materials are designated as surface layer forming coating materials 1-1 to 1-7.

Formation of Surface Layer:

Next, about the conductive elastic roller 1 (the conductive elastic roller having been surface-sanded), seven rollers were readied and these conductive elastic rollers 1 were respectively coated on their peripheries of the conductive elastic layers with the surface layer forming coating materials 1-1 to 1-7 by ring coating (ejection rate: 0.120 ml/s; speed of ring head: 85 mm/s; total delivery: 0.130 ml). The coatings thus formed were each irradiated with ultraviolet rays of 254 nm in wavelength in such a way as to be in an integral light quantity of 9,000 mJ/cm$^2$) to cure the coatings (curing by cross-linking reaction) to form surface layers. The irradiation with ultraviolet rays was performed by using a low-pressure mercury lamp (manufactured by Harison Toshiba Lighting Corporation). Thus, charging rollers 1-1 to 1-7 were obtained.

Evaluation (3): Coating Performance.

How the external appearance of the surface of each charging roller stands was judged by visual observation and according to the following criteria. The results of evaluation are shown in Table 6.

A: Any faulty coating is not seen at all on the surface of the charging roller.
B: Faulty coating has appeared on some part of the surface of the charging roller.
C: Faulty coating has appeared on the whole area of the surface of the charging roller.

Evaluation (4): Measurement of Thickness of Surface Layer.

The layer thickness of the surface layer formed on each charging roller was measured. A section made by cutting the charging roller was observed to make measurement, which was observed by using a scanning transmission electron microscope (trade name: HD-2000; manufactured by Hitachi High-Technologies Corporation).

Evaluation (5): Identification of Si—O—B Linkage.

The presence of the Si—O—B linkage in the surface layer was identified by using ESCA (trade name; QUANTUM 2000, manufactured by Ulvac-Phi, Inc.). More specifically, the roller surface was so made as to be irradiated with X-rays to evaluate the manner of linkage in the surface layer. From an O1s spectrum detected, the presence of the Si—O—B linkage in the surface layer of each charging roller was identified.

Evaluation (6): Measurement of Surface Free Energy.

To calculate the surface free energy of the charging roller 1, its contact angles to three sorts of probe liquids on which three components of surface free energy are known, as shown in Table 3 below, were measured with a contact angle meter (trade name: CA-X ROLL Model, manufactured by Kyowa Interface Science Co., Ltd.). Contact angles θ were measured under the following conditions.

Measurement: Droplet method (true-circle fitting).
Quantity of liquid: 1 µl.
Droplet impact recognition: Automatic.
Image processing: Algorithm-nonreflection.
Image mode: Frame.
Threshold level: Automatic.
In the following, L and S represent corresponding items of a liquid and a solid, respectively.
$\gamma^d$: Dispersion force term.
$\gamma^p$: Polar term.
$\gamma^h$: Hydrogen bond term.

TABLE 3

| Probe liquid | Kitazaki-Hata Theory | | | |
| --- | --- | --- | --- | --- |
|  | $\gamma L^d$ | $\gamma L^p$ | $\gamma L^h$ | $\gamma L^{Total}$ |
| Water | 29.1 | 1.3 | 42.4 | 72.8 |
| Diiodomethane | 46.8 | 4.0 | 0.0 | 50.8 |
| Ethylene glycol | 30.1 | 0.0 | 17.6 | 47.7 |

Unit: mJ/m² (20° C.)

In the above Table 3, $\gamma L^d$, $\gamma L^p$ and $\gamma L^h$ represent the dispersion force term, the polar term and the hydrogen bond term, respectively.

The respective terms ($\gamma L^d$, $\gamma L^p$, $\gamma L^h$) of surface free energy of the three sorts of probe liquids in the above Table 3 and the contact angles θ to the respective probe liquids that were found by the measurement were substituted for those of the following calculation expression (1) to prepare three equations, and their simultaneous cubic equations are solved to thereby calculate the values of $\gamma S^d$, $\gamma S^p$ and $\gamma S^h$. Then, the sum of the values of $\gamma S^d$, $\gamma S^p$ and $\gamma S^h$ was taken as the surface free energy ($\gamma^{Total}$). The charging member of the present invention may preferably have a total surface free energy ($\gamma^{Total}$) of from more than 25 mJ/m² to 35 mJ/m² or less.

Calculation Expression (1)

$$\sqrt{\gamma_L^d \times \gamma_S^d} + \sqrt{\gamma_L^p \times \gamma_S^p} + \sqrt{\gamma_L^h \times \gamma_S^h} = \frac{\gamma_L(1+\cos\theta)}{2}$$

Evaluations (7) & (8): Evaluation of Running Performance of Charging Roller.

The running performance of the charging roller 1 was evaluated in the following way. First, a laser beam printer (trade name: HP Color Laser Jet 4700 Printer; manufactured by Hewlett-Packard Co.) was readied as an electrophotographic apparatus. This laser beam printer delivers A4-size sheets lengthwise.

The charging roller 1 was set in a process cartridge for the above laser beam printer, and this process cartridge was set in the laser beam printer.

Using this laser beam printer and in a low-temperature and low-humidity environment (temperature 15° C./humidity 10% RH), images composed of 4-point size letters of alphabet "E" which were so printed on the A4-size sheet as to be 1% in print percentage were formed on 9,000 sheets, and subsequently a solid black image was formed on one sheet. Here, these electrophotographic images were formed in what is called an intermittent mode in which the rotation of the electrophotographic photosensitive member was stopped over a period of 7 seconds at intervals of reproduction on 2 sheets. The image reproduction in an intermittent mode comes to a larger number of times of friction between the charging member and the electrophotographic photosensitive member than a case in which electrophotographic images are continuously formed, and hence this can be said to be severer evaluation conditions for the charging roller. Here, the electrophotographic images were formed at a speed (process speed) of 164 mm/sec.

—Evaluation (7)

The solid black images thus obtained were visually observed to make evaluation according to the following criteria.

A: Any streaks caused by stains of the surface of the charging roller are not seen on the images.
B: Slight streaks caused by stains of the surface of the charging roller are seen on the images at areas within 3 cm on their both end portions.
C: Slight streaks caused by stains of the surface of the charging roller are seen on the images at areas of more than 3 cm to 5 cm or less on their both end portions.
D: Clear streaks caused by stains of the surface of the charging roller are seen on the images at areas of more than 3 cm to 5 cm or less on their both end portions.

—Evaluation (8)

From the laser beam printer having finished the formation of electrophotographic images on 9,001 sheets as described above, the process cartridge was detached, and the charging roller 1 was taken off this process cartridge, where how much the surface of the charging roller 1 stood stained was visually observed to make evaluation according to the following criteria.

A: Any stains are not visually seen.
B: Slight stains are seen only on roller end portions.
C: Stains are seen only on roller end portions.
D: Stains are seen over the whole roller.

In regard to charging rollers evaluated as "B" in Evaluation (3), they were evaluated as "B" because it was difficult to distinguish the faulty external appearance caused by faulty coating with the surface layer forming coating materials from the surface stains attendant to the image formation.

Examples 2 to 39

Preparation of Condensates 2 to 17

Condensate intermediates 2 to 9 were prepared in the same way as the condensate intermediate 1 in Example 1 except that their components were formulated as shown in Table 4. Details about symbols EP-1 to EP-5 of the components (A) and (B) and also He and Ph which are noted in Table 4 are shown in Table 6.

TABLE 4

| Condensate inter-medi-ate No. | Synthesis 1 | | | | | | | | |
|---|---|---|---|---|---|---|---|---|---|
| | Component (A) | | | | | Component (B) | | | |
| | EP-1 (g) | EP-2 (g) | EP-3 (g) | EP-4 (g) | EP-5 (g) | He (g) | Ph (g) | H$_2$O (g) | EtOH (g) |
| 1 | 11.56 | — | — | — | — | 62.11 | — | 11.34 | 91.87 |
| 2 | 69.97 | — | — | — | — | — | — | 9.61 | 97.26 |
| 3 | 38.35 | — | — | — | — | 33.53 | — | 10.53 | 94.22 |
| 4 | 11.75 | — | — | — | — | 41.08 | 25.64 | 11.52 | 86.64 |
| 5 | — | 9.82 | — | — | — | 64.86 | — | 11.84 | 90.15 |
| 6 | — | — | 13.01 | — | — | 59.72 | — | 10.9 | 93.18 |
| 7 | — | — | — | 11.93 | — | 61.40 | — | 11.21 | 92.11 |
| 8 | — | — | — | — | 13.63 | 62.11 | — | 11.34 | 103.45 |
| 9 | 5.75 | — | — | 6.00 | — | 61.76 | — | 11.28 | 91.99 |

Condensates 2 to 9 were prepared in the same way as the condensate 1 in Example 1 except that their components were formulated as shown in Table 5. About the condensates obtained, they were evaluated in the same way as Evaluation (1) and Evaluation (2) described in Example 1. Details about the component (C) in Table 5, i.e., symbols B-1 to B-3 for the hydrolyzable boron compounds are shown in Table 6.

TABLE 5

| Condensate No. | Condensate inter-mediate No. | Amount (g) | Component (C) | | | B/Si |
|---|---|---|---|---|---|---|
| | | | B-1 (g) | B-2 (g) | B-3 (g) | |
| 1 | 1 | 137.21 | 39.59 | — | — | 1.00 |
| 2 | 1 | 72.38 | 104.42 | — | — | 5.00 |
| 3 | 1 | 171.84 | 4.96 | — | — | 0.10 |
| 4 | 1 | 94.77 | 82.03 | — | — | 3.00 |
| 5 | 1 | 154.51 | 22.29 | — | — | 0.50 |
| 6 | 1 | 64.74 | 112.06 | — | — | 6.00 |
| 7 | 1 | 174.29 | 2.51 | — | — | 0.05 |
| 8 | 2 | 142.07 | 34.73 | — | — | 1.00 |
| 9 | 3 | 139.40 | 37.40 | — | — | 1.00 |
| 10 | 4 | 136.69 | 40.11 | — | — | 1.00 |
| 11 | 1 | 146.67 | — | 30.13 | — | 1.00 |
| 12 | 1 | 128.90 | — | — | 47.90 | 1.00 |
| 13 | 5 | 135.83 | 40.97 | — | — | 1.00 |
| 14 | 6 | 138.39 | 38.41 | — | — | 1.00 |
| 15 | 7 | 137.53 | 39.27 | — | — | 1.00 |
| 16 | 8 | 139.45 | 37.35 | — | — | 1.00 |
| 17 | 9 | 139.55 | 37.25 | — | — | 1.00 |

TABLE 6

| Symbol | Chemical name | Maker | Trade name |
|---|---|---|---|
| EP-1 | 3-glycidoxypropyltri-methoxysilane | Shin-Etsu Chemical Co. | KBM-403 |
| EP-2 | 4-(1,2-epoxybutyl) trimethoxysilane | Carbone Scientific Co. | |
| EP-3 | 8-oxysilan-2-yl octyltrimethoxysilane | SiKEMIA Co. | |
| EP-4 | 1-(3,4-epoxycyclo-hexyl)ethyltrimethoxy-silane | Shin-Etsu Chemical Co. | KBM-303 |
| EP-5 | 3-glycidoxypropyltri-ethoxysilane | Shin-Etsu Chemical Co. | KBE-403 |
| He | Hexyltrimethoxysilane | Shin-Etsu Chemical Co. | KBM-3063 |
| Ph | Phenyltriethoxysilane | Shin-Etsu Chemical Co. | KBE-103 |
| B-1 | Boron ethoxide | Gelest, Inc. | |
| B-2 | Boron methoxide | Gelest, Inc. | |
| B-3 | Boron n-propoxide | Gelest, Inc. | |

The results of Evaluation (1) and Evaluation (2) on the condensates 1 to 17 are shown in Table 7.

TABLE 7

| Condensate No. | Evaluation (1) | Evaluation (2) Presence of formula-(1) structure |
|---|---|---|
| 1 | A | Yes. |
| 2 | A | Yes. |
| 3 | A | Yes. |
| 4 | A | Yes. |
| 5 | A | Yes. |
| 6 | A | Yes. |
| 7 | A | Yes. |
| 8 | A | Yes. |
| 9 | A | Yes. |
| 10 | A | Yes. |
| 11 | A | Yes. |
| 12 | A | Yes. |
| 13 | A | Yes. |
| 14 | A | Yes. |
| 15 | A | Yes. |
| 16 | A | Yes. |
| 17 | A | Yes. |

Production of Charging Rollers 2 & 3

Surface layer forming coating materials 2-1 to 2-5 were prepared in the same way as Example 1 except that the condensate 2 was used. These surface layer forming coating materials were controlled to have solid-matter concentrations of 0.1% by mass 0.2% by mass, 1.0% by mass, 4.0% by mass and 5.0% by mass, respectively. Surface layer forming coating materials 3-1 to 3-5 were likewise prepared by using the condensate 3.

Charging rollers 2-1 to 2-5 and 3-1 to 3-5 were produced in the same way as Example 1 except that the above coating materials were used, respectively. The charging rollers obtained were put to Evaluations (3) to (7).

Charging Rollers 4 to 7

Surface layer forming coating materials 4-1 to 4-3 were prepared in the same way as Example 1 except that the condensate 4 was used. These surface layer forming coating materials were controlled to have solid-matter concentrations of 0.5% by mass, 1.0% by mass and 3.5% by mass, respectively. Surface layer forming coating materials 5-1 to 5-3, 6-1 to 6-3 and 7-1 to 7-3 were likewise prepared by using the condensates 5 to 7, respectively.

Charging rollers 4-1 to 4-3, 5-1 to 5-3, 6-1 to 6-3 and 7-1 to 7-3 were produced in the same way as Example except that the above coating materials were used, respectively. The charging rollers obtained were put to Evaluations (3) to (7).

Charging Rollers 8 to 17

Surface layer forming coating materials 8 to 17 were prepared in the same way as Example 1 except that the condensates 8 to 17 were used, respectively. These coating materials were each controlled to have a solid-matter concentration of 1.0% by mass.

Charging rollers 8 to 17 were produced in the same way as Example 1 except that the above coating materials were used, respectively. The charging rollers obtained were put to Evaluations (3) to (7).

The results of Evaluations (3) to (8) on the above charging rollers according to these Examples are shown in Table 8.

TABLE 8

| Condensate No. | Charging roller No. | (3) | (4) Layer thickness (µM) | (5) Presence of Si—O—B linkage | (6) $\gamma^{Total}$ (mJ/m²) | (7) | (8) |
|---|---|---|---|---|---|---|---|
| Example: | | | | | | | |
| 1 | 1 | 1-1 | A | 0.030 | Yes. | 19.6 | A | A |
|   |   | 1-2 | A | 0.005 | Yes. | 26.2 | B | C |
|   |   | 1-3 | A | 0.010 | Yes. | 24.8 | B | C |
|   |   | 1-4 | A | 0.020 | Yes. | 20.4 | A | A |
|   |   | 1-5 | A | 0.090 | Yes. | 19.4 | A | A |
|   |   | 1-6 | A | 0.100 | Yes. | 19.1 | A | A |
|   |   | 1-7 | B | 0.150 | Yes. | 18.9 | A | C |
| 2 | 2 | 2-1 | A | 0.005 | Yes. | 25.4 | B | C |
|   |   | 2-2 | A | 0.010 | Yes. | 24.3 | B | B |
|   |   | 2-3 | A | 0.030 | Yes. | 19.3 | A | A |
|   |   | 2-4 | B | 0.100 | Yes. | 18.9 | A | C |
|   |   | 2-5 | B | 0.150 | Yes. | 18.5 | A | C |
| 3 | 3 | 3-1 | A | 0.050 | Yes. | 30.2 | C | C |
|   |   | 3-2 | A | 0.010 | Yes. | 26.4 | B | C |
|   |   | 3-3 | A | 0.030 | Yes. | 24.2 | B | B |
|   |   | 3-4 | A | 0.100 | Yes. | 23.9 | B | B |
|   |   | 3-5 | B | 0.150 | Yes. | 23.5 | A | C |
| 4 | 4 | 4-1 | A | 0.020 | Yes. | 20.0 | A | B |
|   |   | 4-2 | A | 0.030 | Yes. | 19.3 | A | A |
|   |   | 4-3 | A | 0.090 | Yes. | 19.2 | A | A |
| 5 | 5 | 5-1 | A | 0.020 | Yes. | 23.1 | A | B |
|   |   | 5-2 | A | 0.030 | Yes. | 22.6 | A | B |
|   |   | 5-3 | A | 0.090 | Yes. | 21.8 | A | B |
| 6 | 6 | 6-1 | A | 0.010 | Yes. | 24.1 | B | B |
|   |   | 6-2 | B | 0.030 | Yes. | 19.1 | A | C |
|   |   | 6-3 | B | 0.100 | Yes. | 18.7 | A | C |
| 7 | 7 | 7-1 | A | 0.010 | Yes. | 34.1 | C | C |
|   |   | 7-2 | A | 0.030 | Yes. | 31.8 | C | C |
|   |   | 7-3 | A | 0.100 | Yes. | 30.5 | C | C |
| 8 | 8 | 8 | A | 0.030 | Yes. | 20.9 | A | A |
| 9 | 9 | 9 | A | 0.030 | Yes. | 20.8 | A | A |
| 10 | 10 | 10 | A | 0.030 | Yes. | 20.3 | A | A |
| 11 | 11 | 11 | A | 0.030 | Yes. | 19.9 | A | A |
| 12 | 12 | 12 | A | 0.030 | Yes. | 19.7 | A | A |
| 13 | 13 | 13 | A | 0.030 | Yes. | 19.3 | A | A |
| 14 | 14 | 14 | A | 0.030 | Yes. | 20.1 | A | A |
| 15 | 15 | 15 | A | 0.030 | Yes. | 20.0 | A | A |
| 16 | 16 | 16 | A | 0.030 | Yes. | 19.7 | A | A |
| 17 | 17 | 17 | A | 0.030 | Yes. | 19.9 | A | A |

Comparative Example 1

Preparation of Comparative Condensate 18

The condensate intermediate 2 according to Example 2 was put to Evaluation (1) as a comparative condensate 18. Incidentally, Evaluation (2) was not made because this comparative condensate 18 did not make use of any hydrolyzable boron compound in the raw materials.

Production of Charging Roller 18

A surface layer forming coating material 18 was prepared in the same way as the surface layer forming coating material 1-1 in Example 1 except that the condensate 18 was used. A charging roller 18 was produced in the same way as the charging roller 1 in Example 1 except that this coating material was used. The charging roller obtained was put to Evaluations (3), (4), (6) and (7). Evaluation (5) was not made because any hydrolyzable boron compound was not used in the raw materials of the condensate.

Comparative Example 2

Preparation of Comparative Condensate 19

A comparative condensate 19 was prepared by hydrolyzing only the component (C) without use of the components (A) and (B) as shown in Table 9 below, and was put to Evaluation (1).

TABLE 9

| Condensate No. | Component (C) B-1 (g) | H₂O (g) | EtOH (g) |
|---|---|---|---|
| 19 | 90.93 | 2.02 | 83.81 |

Production of Charging Roller 19

A surface layer forming coating material 19 was prepared in the same way as the surface layer forming coating material 1-1 in Example 1 except that the above condensate 19 was used and that any cationic photopolymerization initiator was not used. A charging roller 19 was produced in the same way as the charging roller 1 in Example 1 except that this coating material was used. Here, the coating of the condensate 19, formed on the conductive elastic roller, was cured by heating it at a temperature of 250° C. for 1 hour. The charging roller 19 thus obtained was put to Evaluations (3) to (7) in Example 1, provided that Evaluations (4), (6) to (8) were not made because the coating performance of the surface layer forming coating material 19 was so poor as to make it difficult to form the film and that Evaluation (5) was not made because any hydrolyzable boron compound was not used in the raw materials.

The results of Evaluation (1) on the comparative condensates 18 and 19 and the results of Evaluations (3), (4) and (6) to (8) on the charging rollers 18 and 19 are shown in Table 10 below.

TABLE 10

| Condensate No. | (1) | (3) | (4) Layer thickness (µm) | (6) $\gamma^{Total}$ (mJ/m²) | (7) | (8) |
|---|---|---|---|---|---|---|
| Comparative Example: | | | | | | |
| 1 | 18 | A | A | 0.030 | 40.1 | D | D |
| 2 | 19 | A | C | — | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-221810, filed Sep. 30, 2010, which is hereby incorporated by reference herein in its entirety.

What is claimed is:

1. A charging member comprising:
a substrate;
an elastic layer; and
a surface layer,
wherein the surface layer comprises a compound having:
an Si—O—B linkage; and
a constitutional unit represented by formula (1) and a constitutional unit represented by formula (2):

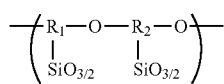
formula (1)

  formula (2)

where, in the formula (1), $R_1$ and $R_2$ each independently represents any of structures represented by formulas (3) to (6):

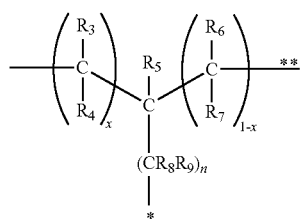
formula (3)

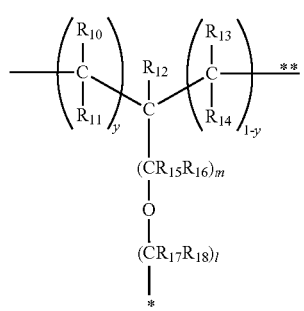
formula (4)

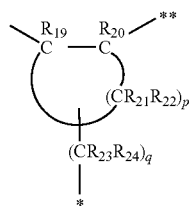
formula (5)

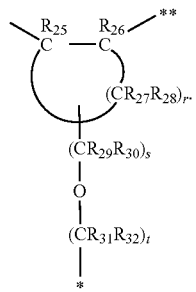
formula (6)

where, in the formulas (3) to (6), $R_3$ to $R_7$, $R_{10}$ to $R_{14}$, $R_{19}$, $R_{20}$, $R_{25}$ and $R_{26}$ each independently represents a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represents a hydrogen atom or an alkyl group having 1 to 4 carbon atom(s); $R_{21}$, $R_{22}$, $R_{27}$ and $R_{28}$ each independently represents a hydrogen atom or an alkoxyl group or alkyl group having 1 to 4 carbon atom(s); n, m, l, q, s and t each independently represents an integer of 1 to 8, p and r each independently represents an integer of 4 to 12, and x and y each independently represents 0 or 1; and an asterisk * and a double asterisk ** each represents a position of bonding with the silicon atom and oxygen atom, respectively, in the formula (1).

2. The charging member according to claim 1, wherein each of $R_1$ and $R_2$ in the formula (1) is any structure selected from structures represented by formulas (7) to (10):

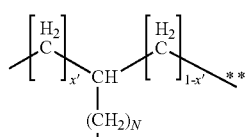
formula (7)

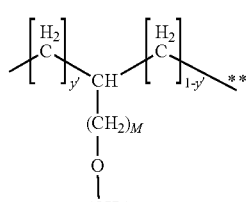
formula (8)

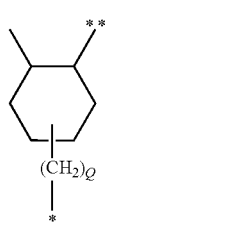
formula (9)

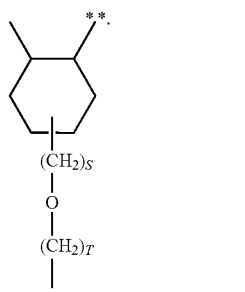
formula (10)

where, in the formulas (7) to (10), N, M, L, Q, S and T each independently represents an integer of 1 or more to 8 or less, and x' and y' each independently represents 0 or 1; and an asterisk * and a double asterisk ** represent respective positions of bonding in the formula (1).

3. The charging member according to claim 1, wherein, in the compound, a ratio of a number of atoms of boron to that of silicon, B/Si, is from 0.1 or more to 5.0 or less.

4. The charging member according to claim 1, wherein the compound is a cross-linked product of a hydrolyzable compound having a structure represented by formula (11) and a hydrolyzable compound represented by formula (12):

$$R_{33}-Si(OR_{34})(OR_{35})(OR_{36}) \quad \text{formula (11)}$$

$$B(OR_{37})(OR_{38})(OR_{39}), \quad \text{formula (12)}$$

where, in the formula (11), $R_{33}$ represents any structure selected from structures represented by formulas (13) to (16), each having an epoxy group; $R_{34}$ to $R_{36}$ each independently represents a hydrocarbon group; and, in the formula (12), $R_{37}$ to $R_{39}$ each independently represents a hydrocarbon group:

$$\underset{R_{42}}{\overset{R_{41}}{>}}C\underset{O}{\overset{}{\triangle}}C\underset{(CR_{44}R_{45})_{n'}}{\overset{R_{43}}{<}}* \quad \text{formula (13)}$$

$$\underset{R_{47}}{\overset{R_{46}}{>}}C\underset{O}{\overset{}{\triangle}}C\underset{(CR_{49}R_{50})_{m'}-O-(CR_{51}R_{52})_{l'}}{\overset{R_{48}}{<}}* \quad \text{formula (14)}$$

formula (15)

$$R_{53}-C\overset{O}{\triangle}C-R_{54}$$
$$(CR_{55}R_{56})_{p'}$$
$$(CR_{57}R_{58})_{q'}$$
$$*$$

formula (16)

$$R_{59}-C\overset{O}{\triangle}C-R_{60}$$
$$(CR_{61}R_{62})_{r'},$$
$$(CR_{63}R_{64})_{s'}$$
$$O$$
$$(CR_{65}R_{66})_{t'}$$
$$*$$

where, in the formulas (13) to (16), $R_{41}$ to $R_{43}$, $R_{46}$ to $R_{48}$, $R_{53}$, $R_{54}$, $R_{59}$ and $R_{60}$ each independently represents a hydrogen atom, an alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represents a hydrogen atom or an alkyl group having 1 to 4 carbon atom(s); $R_{55}$, $R_{56}$, $R_{61}$ and $R_{62}$ each independently represents a hydrogen atom, an alkoxyl group having 1 to 4 carbon atom(s) or an alkyl group having 1 to 4 carbon atom(s); n', m', l', q', s' and t' each independently represents an integer of 1 to 8, and p' and r' each independently represents an integer of 4 to 12; and an asterisk * represents a position of bonding with the silicon atom in the formula (11).

5. The charging member according to claim 1, wherein the compound is a cross-linked product of hydrolyzable compounds represented by formulas (11) and (12) and a hydrolyzable compound represented by formula (17):

$$R_{33}-Si(OR_{34})(OR_{35})(OR_{36}) \quad \text{formula (11)}$$

$$B(OR_{37})(OR_{38})(OR_{39}), \quad \text{formula (12)}$$

where, in the formula (11), $R_{33}$ represents any structure selected from structures represented by formulas (13) to (16), each having an epoxy group; $R_{34}$ to $R_{36}$ each independently represents a hydrocarbon group; and, in the formula (12), $R_{37}$ to $R_{39}$ each independently represents a hydrocarbon group:

$$\underset{R_{42}}{\overset{R_{41}}{>}}C\underset{O}{\overset{}{\triangle}}C\underset{(CR_{44}R_{45})_{n'}}{\overset{R_{43}}{<}}* \quad \text{formula (13)}$$

$$\underset{R_{47}}{\overset{R_{46}}{>}}C\underset{O}{\overset{}{\triangle}}C\underset{(CR_{49}R_{50})_{m'}-O-(CR_{51}R_{52})_{l'}}{\overset{R_{48}}{<}}* \quad \text{formula (14)}$$

formula (15)

$$R_{53}-C\overset{O}{\triangle}C-R_{54}$$
$$(CR_{55}R_{56})_{p'}$$
$$(CR_{57}R_{58})_{q'}$$
$$*$$

formula (16)

$$R_{59}-C\overset{O}{\triangle}C-R_{60}$$
$$(CR_{61}R_{62})_{r'},$$
$$(CR_{63}R_{64})_{s'}$$
$$O$$
$$(CR_{65}R_{66})_{t'}$$
$$*$$

where, in the formulas (13) to (16), $R_{41}$ to $R_{43}$, $R_{46}$ to $R_{48}$, $R_{53}$, $R_{54}$, $R_{59}$ and $R_{60}$ each independently represents a hydrogen atom, an alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represents a hydrogen atom or an alkyl group having 1 to 4 carbon atom(s); $R_{55}$, $R_{56}$, $R_{61}$ and $R_{62}$ each independently represents a hydrogen atom, an alkoxyl group having 1 to 4 carbon atom(s) or an alkyl group having 1 to 4 carbon atom(s); n', m', l', q', s' and t' each independently represents an integer of 1 to 8, and p' and r' each independently represents an integer of 4 to 12; and an asterisk * represents a position of bonding with the silicon atom in the formula (11);

$$R_{67}-Si(OR_{68})(OR_{69})(OR_{70}), \quad \text{formula (17)}$$

where, in the formula (17), $R_{67}$ represents an alkyl group having 1 to 21 carbon atom(s) or an aryl group, and $R_{68}$ to $R_{70}$ each independently represents a hydrocarbon group.

6. An electrophotographic apparatus comprising an electrophotographic photosensitive member and a charging member disposed in contact with the electrophotographic photosensitive member; wherein the charging member is the charging member according to claim 1.

7. A process for producing a charging member comprising the steps of:

forming on an elastic layer a coating film of a coating material containing a hydrolyzed condensate synthesized from a hydrolyzable compound represented by formula (11) and a hydrolyzable compound represented by formula (12):

$$R_{33}-Si(OR_{34})(OR_{35})(OR_{36}) \quad \text{formula (11)}$$

$$B(OR_{37})(OR_{38})(OR_{39}), \quad \text{formula (12)}$$

where, in the formula (11), $R_{33}$ represents any structure selected from structures represented by formulas (13) to (16), each having an epoxy group; $R_{34}$ to $R_{36}$ each independently represents a hydrocarbon group; and, in the formula (12), $R_{37}$ to $R_{39}$ each independently represents a hydrocarbon group:

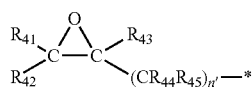
formula (13)

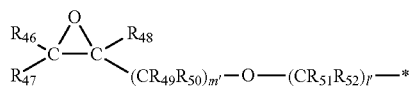
formula (14)

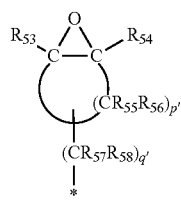
formula (15)

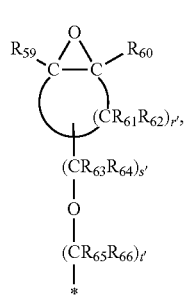
formula (16)

where, in the formulas (13) to (16), $R_{41}$ to $R_{43}$, $R_{46}$ to $R_{48}$, $R_{53}$, $R_{54}$, $R_{59}$ and $R_{60}$ each independently represents a hydrogen atom, an alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represents a hydrogen atom or an alkyl group having 1 to 4 carbon atom(s); $R_{55}$, $R_{56}$, $R_{61}$ and $R_{62}$ each independently represents a hydrogen atom, an alkoxyl group having 1 to 4 carbon atom(s) or an alkyl group having 1 to 4 carbon atom(s); n', m', l', q', s' and t' each independently represents an integer of 1 to 8, and p' and r' each independently represents an integer of 4 to 12; and an asterisk * represents a position of bonding with the silicon atom in the formula (11); and cleaving epoxy groups of the hydrolyzed condensate to effect cross-linking of the hydrolyzed condensate to form a surface layer.

8. A process for producing a charging member comprising the steps of:

forming on an elastic layer a coating film of a coating material containing a hydrolyzed condensate synthesized from a hydrolyzable compound represented by formula (11), a hydrolyzable compound represented by formula (12) and a hydrolyzable compound represented by formula (17):

$$R_{33}-Si(OR_{34})(OR_{35})(OR_{36}) \quad \text{formula (11)}$$

$$B(OR_{37})(OR_{38})(OR_{39}), \quad \text{formula (12)}$$

where, in the formula (11), $R_{33}$ represents any structure selected from structures represented by formulas (13) to (16), each having an epoxy group; $R_{34}$ to $R_{36}$ each independently represents a hydrocarbon group; and, in the formula (12), $R_{37}$ to $R_{39}$ each independently represents a hydrocarbon group:

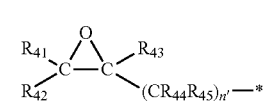
formula (13)

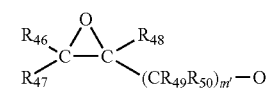
formula (14)

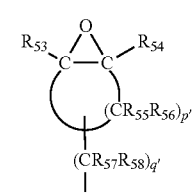
formula (15)

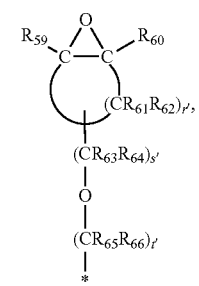
formula (16)

where, in the formulas (13) to (16), $R_{41}$ to $R_{43}$, $R_{46}$ to $R_{48}$, $R_{53}$, $R_{54}$, $R_{59}$ and $R_{60}$ each independently represents a hydrogen atom, an alkyl group having 1 to 4 carbon atom(s), a hydroxyl group, a carboxyl group or an amino group; $R_{44}$, $R_{45}$, $R_{49}$ to $R_{52}$, $R_{57}$, $R_{58}$ and $R_{63}$ to $R_{66}$ each independently represents a hydrogen atom or an alkyl group having 1 to 4 carbon atom(s); $R_{55}$, $R_{56}$, $R_{61}$ and $R_{62}$ each independently represents a hydrogen atom, an alkoxyl group having 1 to 4 carbon atom(s) or an alkyl group having 1 to 4 carbon atom(s); n', m', l', q', s' and t' each independently represents an integer of 1 to 8, and p' and r' each independently represents an integer of 4 to 12; and an asterisk * represents a position of bonding with the silicon atom in the formula (11);

$$R_{67}-Si(OR_{68})(OR_{69})(OR_{70}), \quad \text{formula (17)}$$

where, in the formula (17), $R_{67}$ represents an alkyl group having 1 to 21 carbon atom(s) or an aryl group, and $R_{68}$ to $R_{70}$ each independently represents a hydrocarbon group; and cleaving epoxy groups of the hydrolyzed condensate to effect cross-linking of the hydrolyzed condensate to form a surface layer.

\* \* \* \* \*